United States Patent
Bonilla et al.

(10) Patent No.: US 6,957,426 B2
(45) Date of Patent: Oct. 18, 2005

(54) INDEPENDENT TOOL INTEGRATION

(75) Inventors: Carlos Alberto Bonilla, Fort Collins, CO (US); Terence E. Lister, Fort Collins, CO (US); George Williams, Jr., Fort Collins, CO (US); Humberto A Sanchez, II, Ft Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 609 days.

(21) Appl. No.: 09/827,032

(22) Filed: Apr. 5, 2001

(65) Prior Publication Data

US 2004/0015815 A1 Jan. 22, 2004

(51) Int. Cl.[7] .................. G06F 9/445; G06F 15/173
(52) U.S. Cl. .................. 717/177; 709/223
(58) Field of Search .................. 717/100, 104, 717/105, 108, 174–178; 706/60; 709/223

(56) References Cited

U.S. PATENT DOCUMENTS

| | | | | | |
|---|---|---|---|---|---|
| 5,377,309 A | * | 12/1994 | Sonobe et al. | .................. | 706/60 |
| 5,522,073 A | | 5/1996 | Courant et al. | .............. | 395/700 |
| 5,530,861 A | | 6/1996 | Diamant et al. | ............. | 395/650 |
| 5,950,000 A | | 9/1999 | O'Leary et al. | ............. | 395/701 |
| 6,064,813 A | * | 5/2000 | Sitbon et al. | ................ | 717/100 |
| 6,327,698 B1 | * | 12/2001 | Kolluru | ...................... | 717/104 |

\* cited by examiner

*Primary Examiner*—Kakali Chaki
*Assistant Examiner*—Trent J. Roche (57) ABSTRACT

Independent tool integration uses existing mechanisms, software distributor (SD) commands and a common file directory, to integrate software products without the need to inform the base product beforehand about the new product's software tool definition. The software products may also be automatically updated without the base product having to change.

18 Claims, 5 Drawing Sheets

INDEPENDENT TOOL INTEGRATION

TECHNICAL FIELD

The present invention relates to system administration management in a computer system, and, in particular, to independent software tool integration.

BACKGROUND

Software organizations regularly incorporate and integrate software products from other organizations. However, when two software organizations integrate their software, they normally have to inform each other of the specific information regarding the software, such as the location of the files, the possible interactive behavior of the files, and even the software tool definition. Similarly, when a software product is to be improved and upgraded, the base product typically must have concrete knowledge of the add-on products to allow them to function.

But increasingly, software organizations that intend to integrate another vendor's software product may not want to spend the resource to grasp, for example, the software tool definition of the other vendor's software. Likewise, the other vendor may not want to share the detailed information regarding their software before the tool integration. Accordingly, a need exists for a mechanism to integrate a base product with another product without the need to inform the base product beforehand about the other product's tool definition.

SUMMARY

Independent tool integration uses existing mechanisms, software distributor (SD) commands and a common file directory, to integrate software products, without the need to inform the base product beforehand about the add-on product's software tool definition. Likewise, the software products may be automatically updated without the base product having to change.

A method for independent tool integration may include creating a tool definition file that contains tools to be installed and configured, delivering the tool definition file to a common directory on a server, executing a tool command against the tool definition file to add new tools and to modify existing tools, and delivering the tools defined by the tool definition file to managed nodes using an SD command for installation and configuration.

DESCRIPTION OF THE DRAWINGS

The detailed description refers to the following drawings, in which like numbers refer to like elements, and in which.

DETAILED DESCRIPTION

A service control manager (SCM) module multiplies system administration effectiveness by distributing the effects of existing tools efficiently across managed servers. The phrase "service control manager" is intended as a label only, and different labels can be used to describe modules or other entities having the same or similar functions.

In the SCM domain, the managed servers (systems) are referred to as "managed nodes" or simply as "nodes". SCM node groups are collections of nodes in the SCM module. They may have overlapping memberships, such that a single node may be a member of more than one group. The grouping mechanism may allow flexible partitioning of the SCM module so that users may use it to reflect the way nodes are already grouped in their environment.

Figure 1A:
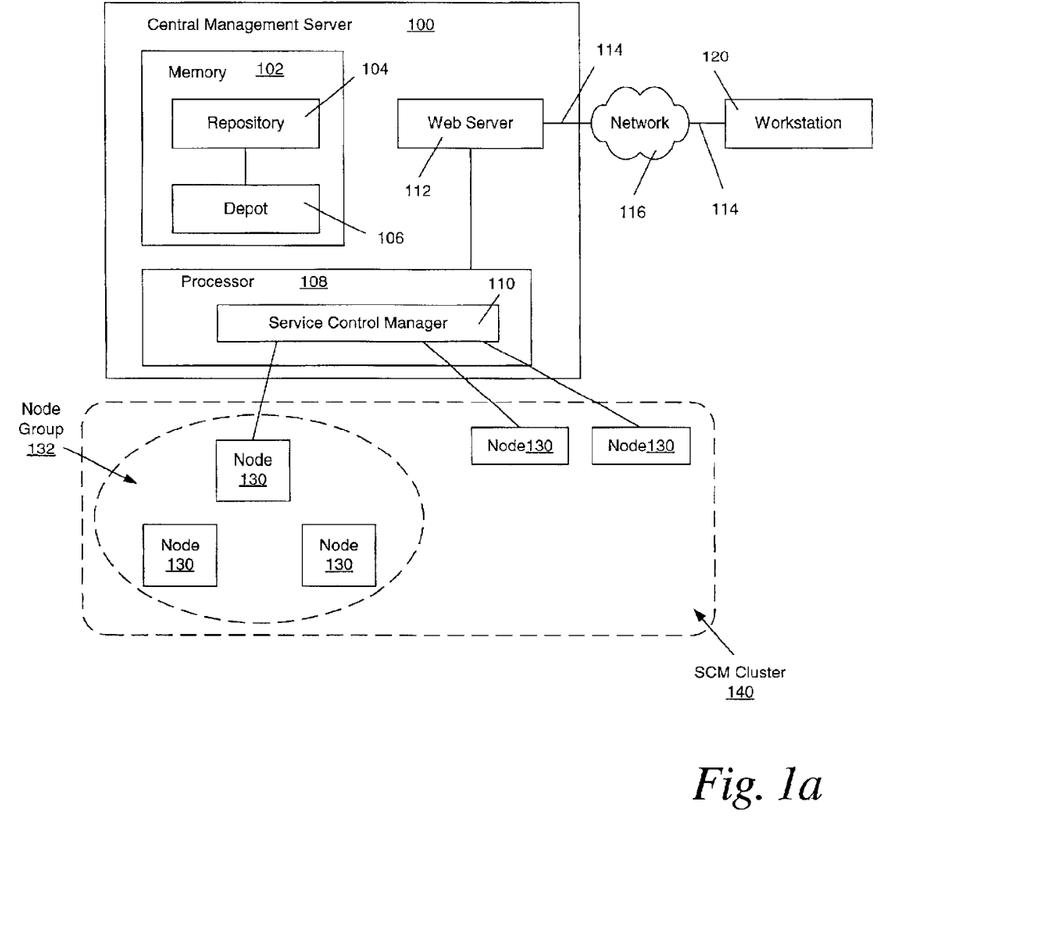
FIG. 1(a) illustrates a computer network system with which the present invention may be used.

FIG. 1 illustrates a computer network system with which the present invention may be used. The network system includes an SCM 110 running on a Central Management Server (CMS) 100 and one or more nodes 130 or node groups 132 managed by the SCM 110. The one or more nodes 130 and node groups 132 make up an SCM cluster 140. Alternatively, the CMS 100 maybe part of the SCM cluster 140. See *ServiceControl Manager Technical Reference* HP® part number: B8339-90019, available from Hewlett-Packard Company, Palo Alto, Calif., which is hereby incorporated by reference and which is also accessible at <http://www.software.hp.com/products/scmgr>, for a more detailed description of the SCM 110.

The CMS 100 can be implemented with, for example, an RP-UX 11.x server running the SCM 110 software. The CMS 100 includes a memory 102, a secondary storage device (not shown), a processor 108, an input device (not shown), a display device (not shown), and an output device (not shown). The memory 102 may include computer readable media, RAM or similar types of memory, and it may store one or more applications for execution by processor 108, including the SCM 110 software. The secondary storage device may include computer readable media, a hard disk drive, floppy disk drive, CD-ROM drive, or other types of non-volatile data storage. The processor 108 executes the SCM software and other application(s), which are stored in memory or secondary storage, or received from the Internet or other network 116. The input device may include any device for entering data into the CMS 100, such as a keyboard, key pad, cursor-control device, touch-screen (possibly with a stylus), or microphone. The display device may include any type of device for presenting a visual image, such as, for example, a computer monitor, flat-screen display, or display panel. The output device may include any type of device for presenting data in hard copy format, such as a printer, and other types of output devices include speakers or any device for providing data in audio form. The CMS 100 can possibly include multiple input devices, output devices, and display devices.

The CMS 100 itself may be required to be a managed node, so that multi-system aware (MSA) tools may be invoked on the CMS. All other nodes 130 may need to be explicitly added to the SCM cluster 140.

Generally, the SCM 110 supports managing a single SCM cluster 140 from a single CMS 100. All tasks performed on the SCM cluster 140 are initiated on the CMS 100 either directly or remotely, for example, by reaching the CMS 100 via a web connection 114. Therefore, the workstation 120 at which a user sits only needs a web connection 114 over a network 116, such as the Internet or other type of computer network, to the CMS 100 in order to perform tasks on the SCM cluster 140. The CMS 100 preferably also includes a centralized data repository 104 for the SCM cluster 140, a web server 112 that allows web access to the SCM 110 and a depot 106 that includes products used in the configuring of nodes 130. A user interface may only run on the CMS 100, and no other node 130 in the SCM module may execute remote tasks, access the repository 104, or any other SCM operations.

Although the CMS 100 is depicted with various components, one skilled in the art will appreciated that this server can contain additional or different components. In addition, although aspects of an implementation consistent with the present invention are described as being stored in memory, one skilled in the art will appreciated that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 100 to perform a particular method.

A central part of the SCM module 110 is the ability to execute various management commands or applications on the one or more nodes simultaneously. The commands or applications may need to be encapsulated with an SCM tool, which is typically used to copy files and/or execute commands on the target nodes 130. The SCM tool may run simple commands such as bdf(1) or mount (1M), launch single system interactive applications such as System Administration Manager (SAM) or Glance, launch multi-system aware applications such as Ignite/UX or Software Distributor (SD), or perform other functions. The tool may be defined using an SCM tool definition language through either a command line interface (CLI) or an SCM-provided graphical user interface (GUI).

Figure 1B:
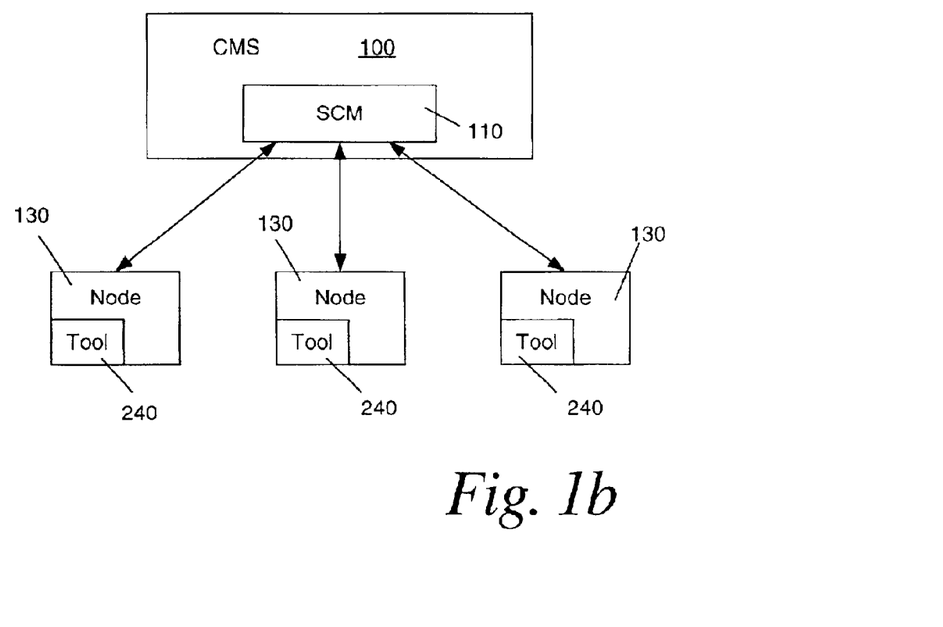
FIGS. 1(b) and 1(c) compare single-system aware tools and multi-system aware tools.

There are two general types of tools: single-system aware (SSA) tools and multi-system aware (MSA) tools. SSA tools, illustrated in FIG. 1(*b*), may run on a node 130 and may only affect the operation of that node 130. To run SSA tools on multiple target nodes 130, the SCM module 110 may execute the tools on each target node 130. In addition to executing commands or launching applications, SSA tools may copy files from the CMS 100 to the target nodes 130. Files may only be copied from the CMS 100 to the managed nodes 130 in this exemplary embodiment, not from the nodes 130 back to the CMS 100.

Figure 1C:
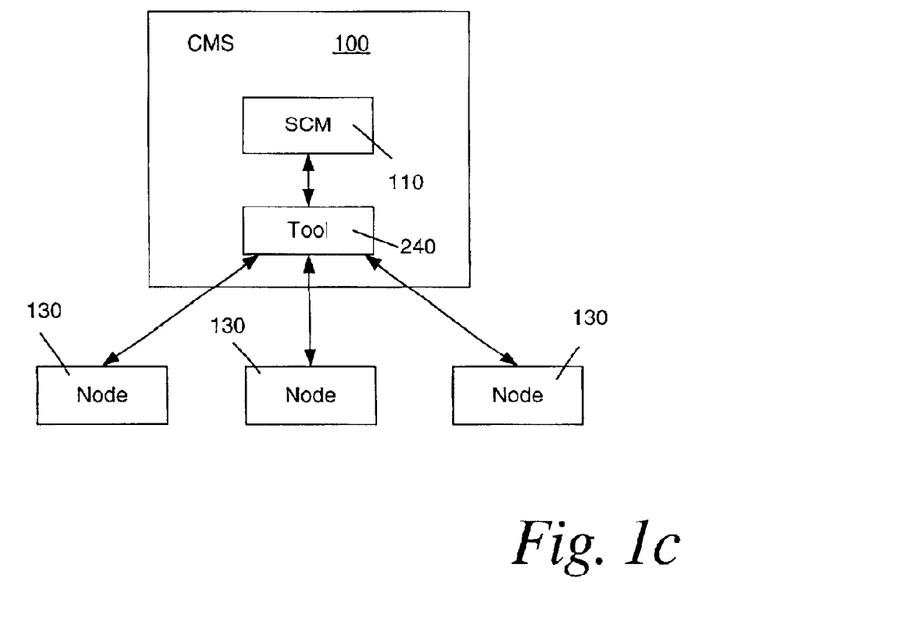

MSA tools, illustrated in FIG. 1(*c*), may run on a single node 130 but may be able to operate on multiple other nodes 130. MSA tools are applications that execute on a single node but can detect and contact other nodes to accomplish their work and this contact is out of the control of the SCM module 110. This type of application may need to have a list of nodes 130 passed as an argument at runtime. A node 130 where the application will execute may need to be specified at tool creation time, not at runtime. The target nodes 130 selected by the user may be passed to an MSA tool via a target environment variable that contains a target node list for the MSA tools. MSA tools may not copy files to either the manager node 100 or to the target nodes 130 in this exemplary embodiment. Therefore, an execution command string may be required for MSA tools.

An SCM user may be a user that is known to the SCM module 110 and has some privileges and/or management roles. An SCM role, which is an expression of intent and a collection of tools for accomplishing that intent, typically defines what the user is able to do on the associated nodes 130 or node groups 132, e.g., whether a user may run a tool on a node 130. Typically, in order to start the SCM module 110 or execute any SCM tools, the user may need to be added to the SCM module 110 and authorized either via the GUI or the command line interface (CLI). All SCM module 110 operations may be authorized based on the user's SCM authorization configuration, and/or whether or not the user has been granted SCM trusted user privilege.

The SCM user may, depending upon the roles assigned, manage systems via the SCM module 110. In addition, the user may examine the SCM module log, and scan the group, node, and role configurations. When the SCM user runs a tool, the result may be an SCM task. The SCM module 110 typically assigns a task identifier for every task after it has been defined and before it is run on any target nodes 130. This identifier may be used to track the task and to look up information later about the task in an SCM central log.

An SCM trusted user is an SCM user responsible for the configuration and general administration of the SCM module 110. The trusted user is typically a manager or a supervisor of a group of administrators whom a company trusts, or another trusted individual. Entrusted with the highest authority, the trusted user may execute any system management task with all of the nodes (machines) managed by the SCM module 110. The capabilities of the trusted user include, for example, one or more of the following: creating or modifying a user's security profile; adding, modifying or deleting a node or node group; role modification; tool modification; and tool authorization. The granting of these privileges implies a trust that the user is responsible for configuring and maintaining the overall structure of the SCM module 110.

An SCM authorization model supports the notion of assigning to users the ability to run a set of tools on a set of nodes. An authorization object is an association that links a user to a role on either a node or a node group. Each role may have one or more tools and each tool may belong to one or more roles. When users are given the authority to perform some limited set of functionality on one or more nodes, the authorization is done based upon roles and not on tools. The role allows the sum total of functionality represented by all the tools to be divided into logical sets that correspond to the responsibilities that would be given to the various administrators. Accordingly, there are different roles that may be configured and assigned with authorization. For example, a backup administrator with a "backup" role may contain tools that perform backups, manage scheduled backups, view backup status, and other backup functions. On the other hand, a database administrator with a "database" role may have a different set of tools. When a user attempts to run a tool on anode, the user may need to be checked to determine if the user is authorized to fulfill a certain role on the node and if that role contains the tool. Once a user is assigned a role, the user may be given access to any newly created tools that are later added to the role. In the example given above, the backup administrator may be assigned the "backup" role for a group of systems that run a specific application. When new backup tools are created and added to the "backup" role, the backup administrator may immediately be given access to the new tools on the systems.

Figure 2:
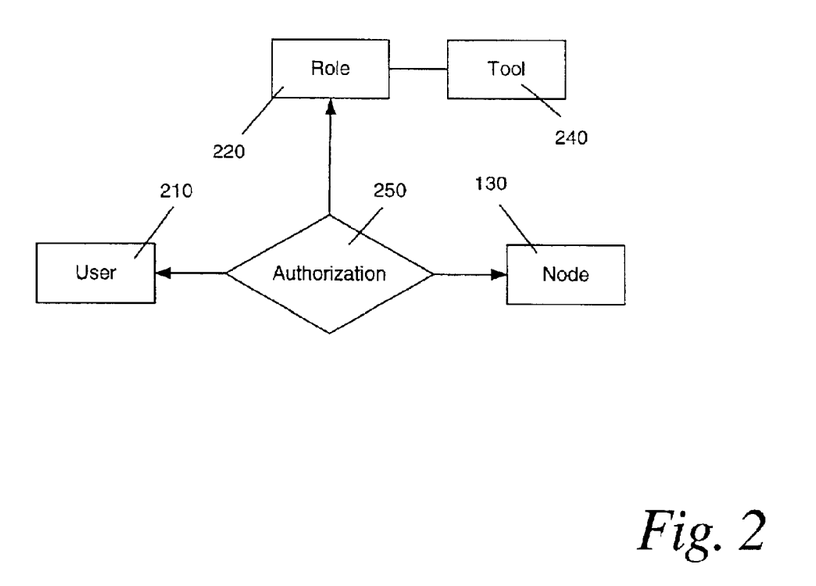
FIG. 2 illustrates the relationships between the user, role, node, tool and authorization objects.

FIG. 2 illustrates the relationships between the user 210, role 220, node 130, tool 240, and authorization 250 objects. User objects 210 represent users 210, role objects 220 represent roles 220, node objects 130 represent nodes 130, tool objects 240 represent tools 240, and authorization objects 250 represent authorizations 250. However, for purposes of this application, these terms are used interchangeably. Each authorization object 250 links a single user object 210 to a single role object 220 and to a single node object 130 (or a node group object 132). Each role object 220 may correspond to one or more tool objects 240, and each tool object 240 may correspond to one or more role objects 220. Each user object 210 maybe assigned multiple authorizations 250, as may each role object 220 and each node object 130. For example, Role 1 may contain Tools 1–N, and User 1 may be assigned Roles 1–M by the authorization model on Node 1. Consequently, User 1 may run Tools 1–N on Node 1, based upon the role assigned, Role 1.

Table 1 illustrates an example of a data structure for assigning tools 240 and commands specified in the tools 240 to different roles 220. Table 2 illustrates an example of a data structure for assigning the roles 220 to different users 210.

TABLE 1

| Roles | Tools | Commands and Applications |
| --- | --- | --- |
| Role 1 | Tools 1-N | Commands 1-L |
| ... | ... | ... |
| Role n | Tools 1-Nn | Commands 1-Ln |

TABLE 2

| Users | Assigned Roles |
| --- | --- |
| User 1 | Roles 1-M |
| ... | ... |
| User n | Roles 1-Mn |

Although FIG. 2 shows a node authorization, a similar structure exists for a node group 132 authorization. The SCM authorization model may be deployed by using node group 132 authorizations more often than node 130 authorizations. This model makes adding new nodes simpler because by adding a node 130 to an existing group 132, any authorizations associated with the group 132 may be inherited at run-time by the node 130.

The authorization model for determining if a user may execute a tool 240 on a set of nodes 130 may be defined by an "all or none" model. Therefore, the user 210 must have a valid authentication association for each target node 130 to execute the tool 240. If authorization does not exist for even one of the nodes 130, the tool execution fails.

The SCM module 110 may also include security features to secure transactions that transmit across the network. All network transactions may be digitally signed using a public or private key pair. The recipient of network transmissions may be assured of who the transmission came from and that the data was not altered in the transmission. A hostile party on the network may be able view the transactions, but may not counterfeit or alter them.

Figure 3:
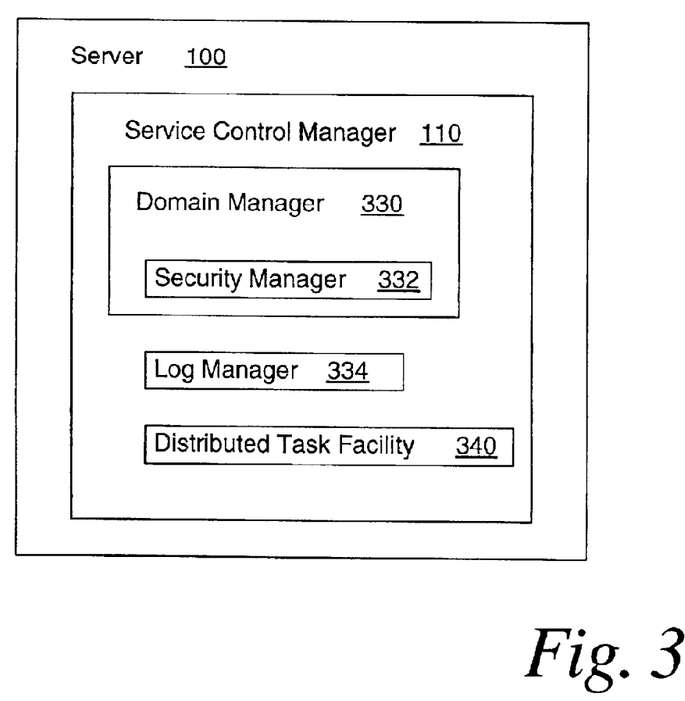
FIG. 3 is a block diagram of an exemplary server used to implement the present invention.

Referring to FIG. 3, the CMS 100 may include a domain manager 330, a log manager 334, and a distributed task facility (DTF) 240. The domain manager 330 is the "brain" of SCM module 110 and may be connected to the repository 104 for storage of the definitions of all the objects.

The DTF 340 may execute tasks by passing the task definitions and information to agents running on the managed nodes 130. The DTF 340 is the "heart" of all task execution activity in that all of the execution steps must go through the DTF 340. The DTF 340 typically obtains an authorized runnable tool from the user 210 through a client, distributes the tool execution across multiple nodes 130, and returns execution results to the clients and to the user 210.

An integral part of the SCM functionality maybe the ability to record and maintain a history of events, by logging both SCM configuration changes and task execution events through the log manager 334. The log manager 334 may manage a log file and take log requests from the DTF 340 and write the requests to the SCM log file. SCM configuration changes may include adding, modifying and deleting users and nodes in the SCM module 110, and creating, modifying and deleting node groups 132 and tools 240. An example of task execution events may include details and intermediate events associated with the running of a tool 240. An example of task execution is described in U.S. Pat. application of Lister, Sanchez, Drees, and Finz, application Ser. No. 09/813,562, entitled "Service Control Manager Tool Execution", and filed on March 20, 2001, which is incorporated herein by reference. The details that are logged may include the identity of the user 210 who launched the task, the actual tool and command line with arguments, and the list of target nodes 130. The intermediate events that are logged may include the beginning of a task on a managed node 130, and exceptions that occur in attempting to run a tool 240 on a node 130, and the final result, if any, of the task. The exit code, and standard output (stdout) and standard error output (stderr), if they exist, may also be logged.

A security manager 332, which is a subsection of the domain manager 330, typically guards the system security by checking whether the user 210 is authorized to run the tool 240 on all of the nodes 130 requested, i.e., whether the user 210 is assigned the roles 220 associated with the tool 240 on all of the nodes 130.

A tool 240 may be started in an SCM environment, which is the memory set aside for the tool 240 to look up attribute values. When launching MSA applications, the SCM environment may be extended to pass additional information by providing additional environment variables. For example, mxuser is a user environment variable that contains the login name or user identification of the user 210 executing the tool 240; mxtask ID is a task environment variable that contains the DTF task ID and uniquely names a tool execution instance; mxtool is a tool environment variable that contains the name of the tool 240 that executed this specific executable; mxtargets is a target environment variable that contains the application's target node list for MSA applications, the list of node names may be space-delimited and sorted in a lexicographic order; mxcms is an environment variable that contains the host name of the Central Management Station; and mxrepository is an environment variable that contains the hostname of the system containing the SCM repository 104. When a user 210 with authorization to nodes 1–5 launches a tool 240, the SCM module 110 determines an identity of the user and establishes environment variables that contain attribute value pairs, so that only nodes 1–5 can be accessed by this user 210. Accordingly, the behavior of these applications is different when they run stand-alone and when they run in the SCM environment, where they have to follow the rules set by the SCM module 110. If the user 210 tries to access resources outside that domain, the attempt will be blocked and an error message returned.

Applications may be integrated into the SCM environment by creating an SCM tool 240 for them. This tool 240 may have a wrapper script, a file based textual directive provided in an Unix shell for interpretation and execution, to process any input parameters and run the application. The application software may need to be pre-installed on the target nodes 130. Accordingly, when two software organizations integrates their software, they typically have to inform each other of the specific information regarding the software, such as the location of the files, the possible interactive behavior of the files, and even the software tool definition. Similarly, when a software product is to be improved and upgraded, the base product typically must have concrete knowledge of the add-on products to allow them to function.

Independent tool integration uses existing mechanisms, software distributor (SD) commands and a common file directory, to integrate software products without the need to inform the base product beforehand about the new product's software tool definition. The software products may also be automatically updated without the base product having to change. SD is the HP-UX administration toolset used to deliver and maintain HP-UX operating systems and layered software applications. SD may allow central IT departments to control an associated software environment. It also improves administrator productivity by automating software distribution.

There may be three parts to independent tool integration. The first part is for the new products to be integrated to create their own tool definition file and provide software product's tools 240. An example of a tool definition is described in U.S. Pat. application of Lister, Sanchez, Drees, and Finz, application Ser. No. 09/800,316, entitled "Service Control Manager Tool Definition", and filed field on March 6, 2001, which is incorporated herein by reference. The tool definition file may define software tools 240 to be executed by the users 210. Only the CMS 100 needs to know the tool definitions. Tool definitions may be added or modified by calling the mxtool command. To create the tool definition file, the tools 240, either SSA tools or MSA tools, may need to provide server software, referred to as server filesets, to be installed on the CMS 100. The server filesets are any filesets in the new products that need to be installed on the CMS 100 for the tool integration to process. The software product's tools 240 may be a set of software commands and files that may be delivered to the managed nodes 130 (described later in part three).

After the tool definition file is created, it may be delivered to a common directory, such as /var/opt/mx/tools, on the CMS 100 using, for example, swinstall; /var/opt/mx/tools is the directory where the tool definition may be delivered to in order to be automatically processed, while swinstall is part of the SD toolset to perform software installations.

The second part of independent tool integration involves determining whether the mxtool command, typically delivered by the SCM software, exists on the CMS 100. If the mxtool is on the CMS 100 and the CMS 100 has been initialized, the mxtool command may first be executed against the tool definition file to add the new tools 240 to the tool definition file. If there are modifications to be made to the previously delivered tools 240, the mxtool command may be executed again to modify the old tools 240. The two steps may be required because the mxtool command may be run with either an -a option (add) or an -m option (modify), and "add" may not alter any existing tools 240, while "modify" may not add any new tools 240 from the tool definition file. For example, a user 210 delivers a tool definition file in January and installed it on the CMS 100. In March, the user 210 delivers a new tool definition file, purporting to modify old tool definitions and to add new tool definitions to the original tool definition. To integrate the new tools 240 and the modifications of the old tools 240, the user 210 may need to first run the mxtool command with the -a option to add the new tools 240, then run the mxtool again with the -m option to ensure that modifications, if any, are properly made.

If either the mxtool command does not exist or the CMS 100 is not initialized, then when a setup command, referred to as mxsetup, is run to initialize the CMS 100, the tool definition files in the /var/opt/mx/tools directory may be automatically processed. The mxsetup command may perform a series of steps to initialize and configure the CMS software. One of the final steps of this series of steps may be to use the mxtool command with the -a option to process each of the files in the /var/opt/mx/tools directory.

The tool 240 may need to provide a corresponding unconfigure script, which may call the mxtool command for the list of tools 240, and remove the tool definition files from the directory. The unconfigure script may be a list of commands run by the SD software removal tool, referred to as swremove. One of the commands in this list may be mxtool command with an -r option, to remove the tool definitions.

The third part of independent tool integration is to deliver the new software product's tools 240 onto all of the managed nodes 130 for installation and configuration. This part may be necessary only if the new product requires that a portion of its software exists on the managed nodes 130. This process may be accomplished using software copying or packaging tools, referred to as swcopy or swpackage, respectively.

As a first step of this process, the software product's tools 240 may be copied or packaged into one or more known software depot directory locations, such as /var/opt/mx/depot 10 and /var/opt/mx/depot 11, which may be automatically created by mxsetup during initialization. The tools 240 may need to provide agent software, referred to as agent filesets, to be installed on the managed nodes 130 for the integration to proceed. In the next step, the SD command, swinstall, maybe used to distribute the agent filesets to all of the managed nodes 130 to be installed and configured. For some tools 240, where the supporting software only needs to be installed on the CMS 100, this step is not necessary.

If the tools 240 require any software synchronization between the CMS 100 and the managed nodes 130, a synchronization software may be delivered in filesets, referred to as agent configure filesets. The configure script that is delivered as part of this fileset may perform any setup steps that are required for this synchronization. For example, if a file on the managed nodes 130 needs to have the CMS's hostname written to it, the configure script may perform that action.

During update, the integration may follow the same steps as the integration during initial setup. A new version of the new product may be required to be installed on the CMS 100. The new product being updated may also provide a new version of its agent fileset for any of the managed nodes 130, and may provide a new version of its agent configure fileset to perform any new synchronization actions. As part of its configure script, the new product's software that is installed on the CMS 100 may run the mxtool command with the -a and -m options to add and modify new and existing tools 240. This new product update may be independent of any SCM base product. If the new product also includes an agent fileset, then that fileset may need to be reinstalled on the managed nodes 130. Finally, if an agent configure fileset needs to be installed, it may be placed into the /var/opt/mx/depot 10 and /var/opt/mx/depot 11 depots, and may be reinstalled on the managed nodes 130.

Figure 4:
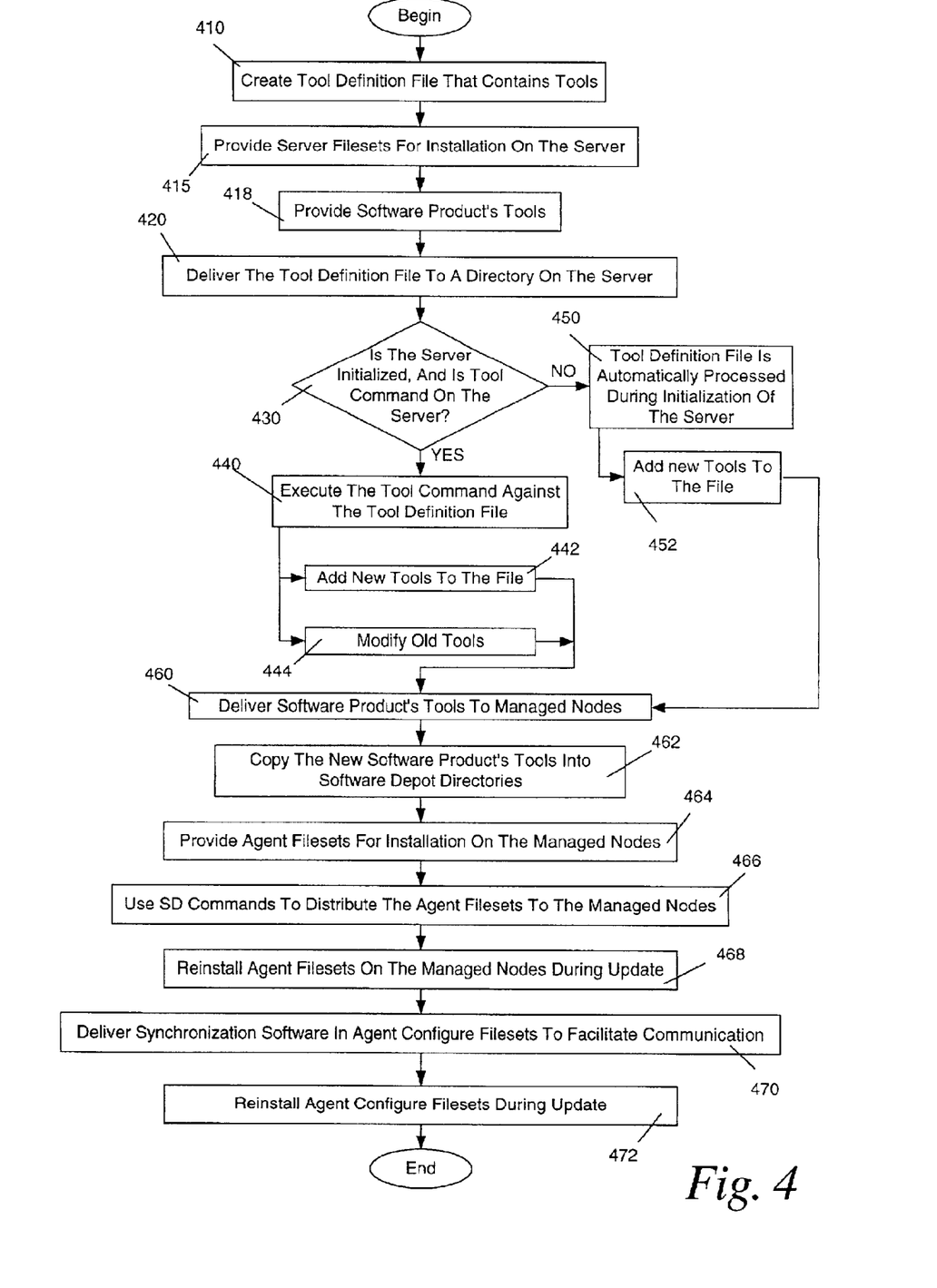
FIG. 4 is a flow chart of a method for independent tool integration in the SCM module.

FIG. 4 illustrates a method for independent tool integration in the SCM module. This method may be implemented, for example, in software modules for execution by processor 108. First, the new products to be integrated may create a tool definition file that define tools 240 to be installed and configured, step 410. This may involve installing server filesets on the server, i.e., CMS 100, step 415. The new products may also provide software product's tools 240 to be delivered later to the managed nodes 130, step 418. Next, the tool definition file may be delivered to a common directory, such as /var/opt/mx/tools, on the CMS 100 using, for example, swinstall, step 420.

In the next step, the SCM module 110 may determine whether the server 100 has been initialized and whether the mxtool command exists on the CMS 100, step 430. If yes, the mxtool command may first be executed against the tool definition file, step 440, to add the new tools 240 to the tool definition file, step 442. If there are modifications to be made to the previously delivered tools 240, the mxtool may be executed again, step 440, to modify the old tools 240, step 444.

If either the mxtool command does not exist or the CMS 100 is not initialized, then when the mxsetup command is run to initialize the CMS 100, the tool definition files in the /var/opt/mx/tools directory may be automatically processed, step 450, which may include adding new tools 240 to the tool definition file, step 452.

In the final step of the independent tool integration, the software product's tools 240 may be delivered to the managed nodes 130 using SD commands, step 460. The first part of the process involves copying or packaging the software product's tools 240 into two or more known software depot directories, such as /var/opt/mx/depot 10 and /var/opt/mx/depot 11, using either the swcopy or swpackage software distributor commands, respectively, step 462. The tools 240 may provide the agent filesets to be installed on the managed nodes 130, step 464. Then, the SD commands may be used to distribute the agent filesets to all of the managed nodes 130 to be installed and configured, step 466. During update, if the new product also includes an agent fileset, the n that fileset may need to be reinstalled on the managed nodes 130, step 468.

If the tools 240 require any software synchronization between the CMS 100 and the managed nodes 130, a synchronization software may be delivered in the agent configure fileset, step 470. Finally, during update, if an agent configure fileset needs to be installed, it may be placed into the /var/opt/mx/depot 10 and /var/opt/mx/depot 11 depots on the CMS 100, and may be reinstalled on the managed nodes 130, step 472.

While the present invention has been described in connection with an exemplary embodiment, it will be understood that many modifications will be readily apparent to those skilled in the art, and this application is intended to cover any variations thereof.

What is claimed is:

1. A method for independent tool integration in a service control manager (SCM) module, comprising:
   creating a tool definition file that defines tools, wherein the tools provide server filesets for installation on a server, the creating step comprising:
      assigning the tools to roles by a trusted user via an authorization model associated with the SCM module; and
      assigning the roles to a plurality of users via the authorization model, wherein the plurality of users are, depending upon the roles assigned, selectively authorized to execute the tools associated with the roles on nodes in a network;
   delivering the tool definition file to a directory on the server;
   determining if a user is authorized to run the tools on each of the nodes in the network;
   executing a tool command against the tool definition file to integrate the tools; and
   delivering software product's tools to managed nodes, the delivering step comprising:
      copying or packaging the software product's tools into software depot directories created during software initialization;
      providing agent filesets for installation on the managed nodes; and
      using software distributor commands to automatically distribute the agent filesets to the managed nodes.

2. The method of claim 1, wherein the creating step includes creating the tool definition file that defines single-system awareness tools.

3. The method of claim 1, wherein the creating step includes creating the tool definition file that defines multi-system awareness tools.

4. The method of claim 1, wherein the executing step includes executing the tool command against the tool definition file to add new tools to the tool definition file.

5. method of claim 1, wherein the executing step includes executing the tool command against the tool definition file to modify old tools in the tool definition file.

6. The method of claim 1, further comprising reinstalling the agent filesets on the managed nodes during update.

7. The method of claim 1, wherein the delivering the software product's tools to the managed nodes step includes delivering the software product's tools to node groups.

8. The method of claim 1, further comprising delivering a synchronization software in agent configure filesets to facilitate communication between the server and the managed nodes.

9. The method of claim 8, further comprising reinstalling the agent configure filesets into the software depot directories on the server and on the managed nodes during update.

10. An apparatus implemented in a computer readable medium for independent tool integration in a service control manager (SCM) module, comprising:
   a module for creating a tool definition file that defines tools, wherein the tools provide server filesets for installation on a server, the creating module comprising:
      roles that are assigned to users and that define which tool the users can run; and
      an authorization model that assigns the roles to the users and authorizes the users to run tools on nodes based on the roles assigned to the users, wherein the users are, depending upon the roles assigned, selectively authorized to execute the tools associated with the roles on the nodes in a network;
   a module for delivering the tool definition file to a directory on a server;
   a module for determining if a user is authorized to run the tools on each of the nodes in the network;
   a module for executing a tool command against the tool definition file to integrate the tools; and
   a module for delivering software product's tools to managed nodes, the module for delivering comprising:
      a module for copying or packaging the software product's tools into software depot directories created during software initialization;
      agent filesets to be installed on the managed nodes; and
      software distributor commands that automatically distribute the agent filesets to the managed nodes.

11. The apparatus of claim 10, wherein the module for executing the tool command adds new tools to the tool definition file.

12. The apparatus of claim 10, wherein the module for executing the tool command modifies old tools in the tool definition file.

13. The apparatus of claim 10, further comprising a module for reinstalling the agent filesets on the managed nodes during update.

14. The apparatus of claim 10, further comprising a module for delivering a synchronization software in agent configure filesets to facilitate communication between the server and the managed nodes.

15. The apparatus of claim 14, further comprising a module for reinstalling the agent configure filesets into the software depot directories on the server and on the managed nodes during update.

16. A method for independent tool integration in a service control manager (SCM) module, comprising:

creating a tool definition file on a server that defines tools, wherein the tools provide server filesets for installation on a server, the creating step comprising:

assigning the tools to roles by a trusted user via an authorization model associated with the SCM module; and assigning the roles to a plurality of users via the authorization model, wherein the plurality of users are, depending upon the roles assigned, selectively authorized to execute the tools associated with the roles on nodes in a network;

delivering the tool definition file to a directory on the server;

determining if a user is authorized to run the tools on each of the nodes in the network;

executing a tool command against the tool definition file to add new tools to the tool definition file;

executing the tool command against the tool definition file to modify old tools in the tool definition file; and delivering software product's tools to software depot directories to be installed on managed nodes using software distributor command; the delivering step comprising:

copying or packaging the software product's tools into software depot directories created during software initialization;

providing agent filesets for installation on the managed nodes; and using the software distributor commands to automatically distribute the agent filesets to the managed nodes.

17. The method of claim 1, further comprising automatically assigning newly created tools to a master role via the authorization model associated with the SCM module, wherein a user having the master role on the nodes is capable of running all tools on the nodes in the network.

18. The apparatus of claim 10, wherein the module for creating the tool definition file further comprises a master role that is automatically provided access to newly created tools, wherein a user having the master role on the nodes is capable of running all tools on the nodes in the network.

* * * * *